United States Patent Office 2,839,482

Patented June 17, 1958

1

2,839,482

WAX-SILICONE-RESIN POLISH

Henry C. Geen, Grand Rapids, Mich., and James D. Quist, deceased, late of Holland, Mich., by Hazel M. Quist, executrix, Holland, Mich., assignors, by mesne assignments, of one-half to S. C. Johnson & Son, Inc., a corporation of Wisconsin, and one-half to Simoniz Company, a corporation of Delaware No Drawing. Application February 25, 1954
Serial No. 412,646

29 Claims. (Cl. 260—23)

This invention relates to improvements in finishes for painted, lacquered, varnished or enameled surfaces and particularly to a polish for such surfaces.

This application is a continuation-in-part of our prior filed application Serial 174,578, filed July 18, 1950, now forfeited which is in turn a continuation-in-part of our earlier filed application Serial 80,782, filed March 10, 1949, Patent No. 2,812,263.

It is one object of the present invention to provide a surface finish for preserving painted, lacquered, varnished or enameled coatings and for enhancing the appearance thereof.

Another object of the present invention is to provide a polish for coated surfaces, which does not require special attention to uniformity of application and which requires only a minimum of rubbing to obtain the desired appearance without marks "of application" or smearing during rubbing.

Another object of the invention is to provide a coating for painted, lacquered, enameled and varnished surfaces which allows the use of the polished article substantially immediately after application of the coating, and from which dust, or lint and the like may be completely and easily removed.

Another object of the invention is to provide a surface polish which is clearer, more transparent and more uniform in appearance than prior polishes, particularly when used on rubbed and transparent finishes, which provides a high gloss or light reflectivity, and which has greater permanence in its originally applied condition than was heretofore obtainable.

A further object of the invention is to provide a coating for painted, lacquered, enameled or varnished articles, which is made from easily obtained ingredients and which is relatively inexpensive.

Generally, the present composition consists of liquid silicone together with one or more waxes in paste or suspension form. A third material, one of the resins as hereinafter defined is added to give greater apparent depth and greater gloss or light reflectivity than is obtained with either of the first two materials alone. Additional materials may be added to improve appearance, increase the viscosity or "body" and simplify manufacture of the compositions while allowing the cost thereof to be reduced, if desired.

The silicone materials employed are incompatible with the waxes and are liquids of substantially linear structure, are substantially non-volatile, and are organopolysiloxanes, preferably polydialkysiloxanes, and most desirably fluid dimethyl or diethylpolysiloxanes. A fluid silicone having a minimum of about five centistokes viscosity constitutes the lowest practical operative material which will be employed in most applications, however, a viscosity below about 5,000,000 centistokes constitutes a preferred maximum therefor, and a polydimethylsiloxane having a viscosity range between about fifty to about 10,000 centistokes and a polydiethylsiloxane having a viscosity range between about 5,000 and 100,000 centistokes is the optimum preferred range therefor.

Factors which will govern the choice of a particular viscosity and specific organopolysiloxane material will be penetration into surface polished, amount of rubbing required to accomplish gloss, thickness of the silicone film deposited, et cetera, desired in the final polish and film formed therewith.

The waxes may be either crystalline or amorphous in structure and may be of mineral, animal, synthetic or vegetable origin. The particular waxes used and their proportions depend on the desired physical qualities of the applied polish. The waxes which can be used include, for example, beeswax, ozokerite, microcrystalline, paraffin, I. G. waxes (I. G. Farben) O, E, V, Acrawax C (Glyco Products), sugar-cane, esparto, shellac, Chinese insect, wool, carnauba, et cetera, individually or in combination of any two or three or all of the above. The waxes are blended to obtain the properties desired in the final polish, as is well known. The waxes are dissolved or dispersed in suitable solvents which are compatible with the silicone employed and form therewith a dispersion which separates only to a fractional degree even upon standing at room temperatures for extended periods. The waxes must be used with a sufficient quantity of silicone to avoid a haziness or smokiness in the applied polish.

A resin is added, primarily to improve the gloss, but in some types of polishes, resin is added to control flexibility or hardness of the resulting film, as well as the transparency, penetration, apparent depth, et cetera. The resin to be employed must have the following characteristics: (*a*) be compatible with the wax which is employed; (*b*) be soluble or miscible in the solvent used; (*c*) be thermoplastic; (*d*) be non-volatile at room temperature; (*e*) be incompatible with the silicone fluid used; and (*f*) be a substantially non-cross-linked polymer having thermoplasticity. Such resins may be used in relatively high proportions based on the other ingredients of the composition compared to present commercial practice, without imparting stickiness to the polish or substantially increasing the drying time. It has been found that the incorporation of the resin in normal amounts does not add a material amount of "frictional drag" during the little rubbing required for polishing and all application marks or streaks are readily eliminated.

Various water-insoluble soaps can be used, such as aluminum stearate or palmitate, but the stearate is preferred as being less likely to impart greasiness to the polish. The present soaps control viscosity and are dispersing agents or homogenizers in preventing coagulation of the waxes into globules of material size during the manufacture and are not emulsifying agents as is the usual purpose for soaps in wax and oil-water types of emulsions.

Where it is desired that the polish have a slight abrasive action as for removing faded surface portions of automobile finishes, silica of diatomaceous origin and of varying particle size, may be suspended in any of the following formulations. Other than the above change, the abrasive polish formulations may follow any of the various examples given, although other and special formulae for abrasive polishes are also disclosed herein.

The following examples of particular compositions are given for illustrative purposes only and are not to be construed as limiting.

*Example 1*

| | Parts by weight |
|---|---|
| Silicone | 3.0– 5.0 |
| Mineral wax | 2.0– 4.0 |
| Vegetable wax | 1.0– 2.5 |
| Petroleum solvent | 60.0–120.0 |
| Terpene resin | 1.0– 3.0 |
| Water-insoluble soap | 1.0– 3.0 |

The above polish has a total non-volatile content of 6.25 percent to 21.5 percent by weight.

*Example 2*

| | Parts by weight |
|---|---|
| Silicone | 3.0– 5.0 |
| Ozokerite | 1.0– 1.5 |
| Paraffin | 1.0– 2.5 |
| Esparto, carnauba or sugar-cane wax | 1.0– 2.5 |
| Naphtha or hexane | 60.0–120.0 |
| Terpene resin | 1.0– 3.0 |
| Aluminum stearate or palmitate | 1.0– 3.0 |

The above polish has a total non-volatile content of 6.25 percent to 21.5 percent by weight.

*Example 3*

| | Parts by weight |
|---|---|
| Silicone | 3.0– 5.0 |
| Mineral wax | 2.0– 4.0 |
| Vegetable wax | 1.0– 2.5 |
| Mineral spirits | 15.0–55.0 |
| V. M. and P. naphtha | 10.0–45.0 |
| Terpene resin | 1.0– 3.0 |
| Water-insoluble soap | 1.0– 3.0 |
| Abrasive | 10.0–30.0 |

The above polish has a total non-volatile content of 15.25 percent to 45 percent by weight.

Special light naphtha or straight mineral spirits may be used in place of the mineral spirits and V. M. and P. naphtha mixture above given.

*Example 4*

| | Parts by weight |
|---|---|
| Silicone | 3.0– 5.0 |
| Ozokerite | 1.0– 1.5 |
| Paraffin | 1.0– 2.5 |
| Esparto, carnauba or sugar-cane wax | 1.0– 2.5 |
| Naphtha or mineral spirits | 60.0–120.0 |
| Terpene resin | 1.0– 3.0 |
| Aluminum stearate or palmitate | 1.0– 3.0 |
| Diatomaceous silica | 12.0– 26.0 |
| Water | 1.0– 5.0 |

The above polish has a total non-volatile content of 14.25 percent to 41.5 percent by weight.

The silicone is a polydimethylsiloxane of 200–500 centistokes viscosity at 25 degrees centigrade.

The ozokerite has a melting point of 195 degrees Fahrenheit, a penetration value of 2–7 (A. S. T. M. method D 5–25, in $\frac{1}{10}$ millimeter at 100 grams, five seconds, 77 degrees Fahrenheit), a viscosity of 75–85 (A. S. T. M. method D 88–44 at 210 degrees Fahrenheit with Saybolt Standard Universal orifice) and is yellow in color. The paraffin is the refined grade and has a melting point of 125–127 degrees Fahrenheit.

The esparto wax has a melting point of 162–164 degrees Fahrenheit, an acid value of 23.9–30.2 and a saponification value of 61.6–69.8 (in milligrams of 0.5 N KOH required for complete saponification of one gram of wax), and the color is dark tan. The carnauba wax has a melting point of 182–187 degrees Fahrenheit, an acid value of 6–10 (in milligrams of 0.1 N KOH required to neutralize one gram of wax), a saponification value of 70–90 and the color varies from light yellow to light grey dependent on the degree of refining.

The sugar-cane wax has a melting range of 174.2–177.8 degrees Fahrenheit, an acid number range of 23–28, a saponification number range of 65–77, an iodine value of 17, specific gravity is 0.9830 at 25 degrees centigrade, and the penetration (100 grams 5 seconds, 77 degrees Fahrenheit) is 2 maximum. The color is brown.

The special light naphtha has a boiling range of 300–325 degrees Fahrenheit, a closed cup flash point of 95 degrees Fahrenheit, a kauri butanol value of 44 and a specific gravity of .7810. The mineral spirits have a boiling range of 313–391 degrees Fahrenheit, a closed cup flash point of 103 degrees Fahrenheit, a kauri butanol value of 37 and a specific gravity of .7861. The V. M. and P. naphtha has a boiling range of 218–300 degrees Fahrenheit, a closed cup flash point of 35 degrees Fahrenheit, a kauri butanol value of 35, and a specific gravity of .7370.

It will be understood that the solvents used are mutual solvent-dispersants for the silicone, the resin, and the waxes, to overcome the effect of the incompatibility of silicone and waxes, and silicone and resins, at temperatures up to the melting point of the waxes or resins, and particularly at room temperatures, by acting as a media in which a uniform distribution of the three materials is easily maintained. If the effects of such incompatibility are not overcome, it is difficult to produce a homogeneous composition. A sufficient quantity of solvent must be present to act as a mutual solvent-dispersant for the silicone, the waxes, and the resins, and sufficient heat must be used during the manufacture of the polish to produce a uniform dispersion of the waxes and resins upon cooling to room temperatures. The waxes form a suspension in the silicone-solvent system, but there is no separation of the silicone from the solvent. However, very little shaking is required to disperse the wax homogeneously in the silicone-solvent mixture even if the polish stands for an excessive length of time.

In the case of certain resins, there will not be solution of the resin, but rather a solvent-dispersant action of the solvent on the resin. This operates in substantially the same way as the wax is dispersed in the solvent, and will be found to allow the application of the resin in the same manner as the wax.

As stated hereinbefore, the resin employed must: (*a*) be compatible with the wax which is employed; (*b*) be soluble or miscible in the solvent used; (*c*) be thermoplastic; (*d*) be non-volatile at room temperature; (*e*) be incompatible with the silicone fluid used; and (*f*) be a substantially non-cross-linked polymer having thermoplasticity. Representative resins which are suitable and have the foregoing characteristics include, for example, hydrocarbon terpenes, chlorinated polyphenyls, coumarone indenes, epoxy resins, phenolic resins, silicone resins, rosin and rosin compounds, chlorinated paraffins, polymerized hydrocarbon resins, terpene phenolics, alkyds, polyamides, styrene resins, natural resins, et cetera. Commercially available examples of the foregoing resins are presented in the following table:

| Trade Name and Manufacturer | Chemical Description |
|---|---|
| Clorafins [1] (Hercules Powder Co.) Such as Clorofin 70. | Chlorinated paraffins. |
| Chlorowax [1] | A cream-colored, powdered nontoxic, resinous chlorinated paraffin. Specific gravity 1.6–1.7, melting point 90–100° C., insoluble in water but soluble in hydrocarbons, ketones, esters, nitroparaffins, and chlorinated hydrocarbons. |
| Piccolytes [1] (Penn. Ind. Chem. Corp.) Such as S–125, S–115, S–100, S–85, S–70. | A light-colored thermoplastic terpene resin available in various melting point grades. |
| Polyamide Resins [1] (General Mills, Inc.) Such as 90S, 93S, 95S. | A group of alcohol-soluble resins made by the reaction of dimerized and trimerized linoleic and linoleic acids of soy bean oil with ethylenediamine. |
| Poly-Pales [1] (Hercules Powder Co.) Such as N. WG, and WW; Limed Poly-Pale (both 5 and 6%). | A hard, brittle polymerized resin having a colored grade of N–WG melting at 208–217° F. |
| Staybelite [1] (Hercules Powder Co.). | A hard, brittle hydrogenated rosin. |
| Amberols [1] (Rhom and Haas) Such as B/S–1, F–7, F–77, M–21, M–82, M–88, M–93, 226, ST–137, ST–137X, 800, 801, 801–P, 806–P, 808, 926. | Modified phenolic resins, 100% phenolic resins and maleic rosin esters. |
| Amberlac [2] (Rhom and Haas) Such as B–94 and D–96. | B–94 is a volatile solution of maleic resin. D–96 is a maleic resin with a softening range of 98–100° F., acid No. 30–50 and specific gravity 1.1. |
| Duraplex [1] (Rhom and Haas) Such as ND–78 and C–55. | Alkyd resins. |

See footnote at end of table.

| Trade Name and Manufacturer | Chemical Description |
|---|---|
| Epon Resins [2] (Shell Chemical Co.) Such as 1064. | Bisphenol A-epichlorohydrin condensate having melting points ranging from 64–155° C. |
| Alathon F [1] (Du Pont) | A polyethylene resin. |
| Piccolastics [1] (Penn. Ind. Chem. Corp.) Such as A–50, E–75, B–50, E–50. | A series of resins produced from crude mixtures of styrene and styrene homologues, such as those obtained from the fractionation of the "crude solvent" from light oils scrubbed out of coke-oven or gas-house gas. They are permanently thermoplastic and have excellent heat stability at temperatures up to at least 175° C. |
| Piccoumarons [1] (Penn. Ind. Chem.) Such as Picco–100, Bunarex 40, 50, 75, 100, 150. Resin 450, 450E, 450L, 450H, 420, 440. | A group of paracoumaroneindene synthetic resins produced by the polymerization of the unsaturate in coal-tar light oil and similar raw materials. They are thermoplastic and do not become infusible on heating. The bunarex resins are a dark coumarone-indene resin. |
| Aroclors [1] (Monsanto Chemical) Such as 1270, 4465, 5460, 1268. | A series of chlorinated hydrocarbons, characterized by non-inflammability, high dielectric strength and resistivity, low vaporization loss and stability to heat, acids and alkalies. They are thermoplastic and non-drying. |
| Cumars [1] (Barrett Div. Allied Chemical and Dyes) Such as W, V, T–3, T–6, T–15, MH, RH, EX. | A paracoumarone resin consisting of a mixture of polymerized coumarone and polyindene obtained from solvent-naphtha fractions of coal-tar. It is waterproof and resists mild acids and alkalies. |
| Nevillite [1] (Neville Co.) | A cycloparaffin or naphthene polymer containing no esters and having a negligible acid number and a low degree of unsaturation. |
| Durez [2] (Durex Plastics & Chemical Co.) Such as 219. | A thermoplastic terpene modified phenolic resin having a softening range of 149–155° C., acid No. 60–70 and specific gravity 1.09. |

[1] These resins are identified in Zimmerman and Lavine, "Handbook of Material Trade Names," 1953 edition, Industrial Research Service, Doner, New Hampshire.

[2] These resins are identified in the Scientific Section, National Paint, Varnish and Lacquer Association, Inc., Circular 738, published in May 1950 entitled "Resin Index of 1950," compiled by Francis Scofield.

The following naturally occurring resins and chemically named resins may also be used:

Wood rosin, any color grade
Limed M and N, wood rosin (Hercules Powder Co.)
Abietic acid
Batavia Damar, A/D
Batavia Damar Standard A/E
Singapore Damar No. 1
Congo ester
Easter gum
Pale Batu
Black Damar
Pale East India (Macassar)
Pale East India (Singapore)

It is to be understood that the above table of resins is only a recital of certain specific materials which may be used in the formulations of the present invention, however, it is not to be construed as limiting the invention thereto.

Although the aluminum stearate or palmitate mentioned is preferred, it will be understood that any soap may be used which is insoluble in water and which forms a gel with or is soluble in the mutual solvent for the silicone and the waxes. Hence, the term "metallic soap" embraces both the alkaline metallic-earth soaps, and soaps of metals other than the alkali metals, and which have the above characteristics. Common grades of aluminum mono-stearate are preferably used, although both the distearate and the tristearate are suitable. The aluminum palmitate is more effective in changing viscosity than stearates.

The abrasive is a diatomaceous silica which may be calcined. The individual particles are porous and have a cellular structure and range in size from one to four microns. The specific gravity varies from 2.0–2.3. Typical chemical analysis is 89.4 percent by weight of $SiO_2$.

The water used in the abrasive polishes reduces viscosity of the aluminum stearate-naphtha gel and facilitates application of the polish. We believe that some of the water is absorbed by the silica, which, after evaporation of the solvents, assists in separating the silica from the other constituents which are hydrophobic. The complete removal of the silica from the polish film is thus facilitated.

In preparation of the non-abrasive polishes of Examples 1 and 2, all of the waxes are dissolved in so much of the heated naphtha or other solvent as is convenient to handle. The silicone, terpene resin and aluminum soap are then added to the solution and the whole is heated with agitation at 200–215 degrees Fahrenheit until clear and homogeneous. The entire solution is cooled to room temperature with agitation resulting in a high viscosity material which results in the production of a fine-grained suspension of uniform appearance. The remainder of the solvent or vehicle is then added with agitation over a period of time, usually five to fifteen minutes, to reduce the viscosity and solids content of the dispersion.

In preparation of the abrasive content polish of Examples 3 and 4, all of the waxes are dissolved in so much of the heated solvent as is necessary and the terpene resin is added. The aluminum stearate is dispersed in the silicone and the dispersion is added to such solution. The solution is then heated with agitation to 200–215 degrees Fahrenheit until clear and homogeneous. The silica is then added and the mixture cooled to room temperature with agitation. The remainder of the solvent and the water is then added slowly while the agitation is continued, such agitation being sufficient to disperse all of the abrasive uniformly throughout the solution. If difficulty is experienced in obtaining a uniform dispersion with the equipment available at any particular location, the suspension may be circulated through a centrifugal pump to assist in obtaining uniform dispersion. It has been found that the present compositions spread easily and uniformly. A highly reflective surface is obtained which does not retain dust, lint, et cetera, so that the article may be easily kept clean. The present polishes present a better "feel" than prior polishes. The clarity and gloss of the polished surface is retained for a longer time than with other polishes and is readily restored by very light applications of the present compositions. The apparent depth of the finish is intensified and, if the article has an ornamental grain, the appearance of the grain is enhanced. The finish is resistant to abrasion and to sunlight.

It will be understood that the present compositions may include a dye, stain, or pigment for use in finishing raw wood, or for re-finishing articles which have been gouged or scratched sufficiently to expose the surface of the wood.

The solvent which is employed is a liquid volatile organic solvent for the silicone material, and in which the wax and resin may be dispersed. The selection of the solvent will be dependent to some extent upon the particular surface to be treated, and it is important that the finish to be treated be resistant to the solvent action of the material used, and upon other considerations such as drying time, flammability, temperature of use, et cetera. By "solvent-dispersant" as used herein, is meant miscible with the material above the melting point of the material. Thus, a true solution need not be imparted to the resin and wax which is employed, but rather, if a dispersion of the resin and wax throughout the solvent may be accomplished, such solvent is suitable. Representative solvents which have been found suitable in the compositions of the present invention with the proper selection of wax and resin, include, for example, carbon tetrachloride, methylene chloride, chloroform, ortho-dichlorobenzene, ethylene dichloride, perchloroethylene, trichloroethylene, benzene, toluene, xylene, coal-tar naphtha, ethyl ether, diisopropyl ether, hexyl ether, amyl acetate, methyl ethyl ketone, 2-ethyl hexanol, cyclohexane, gasoline, mineral seal oil, V. M. and P. naphtha, Stoddard's solvent, mineral spirits, et cetera, and, in some cases, acetone, butanol, dioxane, ethanol, heptadecanol, isopropanol, diethyl Cellosolve (carbide and carbon), et cetera. Thus, the solvent employed should be a liquid, organic material which is a solvent for the silicone employed, and is a solvent-dispersant for the wax and resin which is employed. Additionally, the solvent should not have a solvent action on the finish which is to be polished, and thus, where a plain metal surface is to be polished, all of the foregoing solvents will be satisfactory. However, where a nitrocellulose lacquered or varnished, or some alkyd resin finishes, are to be polished, a selection of the solvent to be employed should be rather carefully done, in order that the finish itself may not be affected by the solvent.

Silicone imparts clarity, gloss, ease of polishing, water repellance, smoothness, and durability to the polish. Waxes add their known qualities plus the highly important quality of preventing globular or specked appearance which is produced by a silicone solution or solvent mixture without the waxes. The waxes in combination and form herein presented do not require the amount of buffing or polishing heretofore associated with wax polishes for producing a uniform finish. Combinations of waxes are used to provide easier buffing or polishing characteristics than can be obtained from any single wax and to limit the amount of silicone otherwise required. The aluminum soap controls the viscosity and dispersion of the other materials during manufacture and in the finished product and produces a fine grained uniform suspension with the use of relatively inexpensive mixing equipment. The solvents serve as vehicles for all of the other constituents, being solvents or dispersants for the waxes and resins and completely miscible with the silicone. The diatomaceous silica provides a safe abrasive for removing oxidized paint or dirt from surfaces to be polished and which could not be removed merely by washing.

Only the usual mixing kettles are required for manufacture of the present polish and no special precautions are necessary in such manufacture, except to keep within the usual handling practices for the flammable solvents, when used. The present polish avoids the hazy or translucent effects obtained with the usual polishes and retains its clear and transparent appearance until all the polish has been worn or washed off.

The present polish also avoids stickiness and greasiness of prior polishes employing only wax, resin, water-soluble soaps and various vehicles and in various combinations. No precautions are required in applying the polish uniformly as was necessary with prior polishes and the effort required in buffing or polishing is reduced to only a fraction of that heretofore necessary.

We have reason to believe that the incompatibility of the materials herein specified, is responsible in large part for the easy application and polishing characteristics of the present compositions. It is our theory that the incompatibility of silicone with the wax-resin-soap mixture, produces a discontinuous film in which some silicone is dispersed. Because of this discontinuity of the film, and the "voids" formed by the silicone, it is no longer necessary to be especially careful in applying a uniform film because the film is readily spread during the polishing operation. We have found that a film of the materials above specified but omitting silicone, is very adhesive and cohesive when the solvent has evaporated, rather than easily spread and polished as when the silicone is present. Further, the silicone keeps the wax-resin-soap mixture in such form that any excess of both the silicone and the wax and of the other constituents is easily removed. Hence, we believe that incompatibility of the materials used in the present polish produces ease of application and polishing which were not heretofore obtainable, and that such incompatibility is both beneficial and desirable.

The proportions are varied depending on usage of the polish. Thus, where the polished surfaces are not subject to abrading and the highest possible gloss is desired, as on vertical surfaces, display shelves and the like, greater amounts of resin are used. Where application of the polish is particularly difficult as in relatively inaccessible locations or on intricate carvings, a greater amount of silicone is used to obtain satisfactory coating with the minimum of rubbing. Where the polishes are subject to day-by-day use and especially on tables where binders, books and the like are continuously slid over the surfaces, the proportions of both wax and resin are kept high. On unsealed woods or other porous surfaces, a high proportion of wax will produce a good polish with the use of a minimum of material. It will thus be seen that the present formulae provide for polishes easily adaptable to any given use to be made of the polish. The phrase "parts by weight" as used herein, means the relative proportional weight of the recited constituents of the composition, regardless of added, optional or inert constituents.

Additionally the following examples will illustrate further certain polishes within the scope of the present invention, however, they are not to be construed as limiting.

*Example 5*

| | Parts by weight |
|---|---|
| Polydiethylsiloxane—5,000 centistokes | 2.0 |
| Ozokerite | 2.0 |
| Aroclor 5460 (Monsanto) | 0.2 |
| Xylene | 95.8 |
| | 100.0 |

This material can be used as a general purpose polish.

As is evident hereinbefore, the invention provides a composition containing four classes of materials, i. e., a siloxane, a wax, a resin, and a solvent class, each of which has been specifically defined. It is to be understood that polydimethylsiloxane of lower or higher viscosity may be substituted for the polydiethylsiloxane, or polydiethylsiloxane of different viscosity may be used, micro-crystalline wax, beeswax, carnauba wax or multiple maxtures may be used in place of ozokerite, Durez 51270 (a terpene-phenolic resin), Piccopale 100 (a polymerized hydrocarbon resin), Polypale WW (a polymerized rosin), Chlorowax (a chlorinated paraffin wax), et cetera, may be used in place of the Aroclor 5460, and toluene, carbon tetrachloride, Stoddard solvent, et cetera, may be used in place of the xylene of the above Example 5. In any polish made embodying the compositions of this invention, blends of materials may be used within each class of substances so long as the materials in each class are compatible with each other and also fit into the basic class requirements set forth hereinbefore. Thus, a micro-crystalline-beeswax-carnauba-paraffin-Acrawax IG, et cetera blend may be substituted for the ozokerite in the examples given, a blend of resins such as Piccopale 100-Aroclor 4465-Piccolyte S-115 may be substituted for the Aroclor 5460 alone as shown, and solvent blends such as mineral spirits-perchloroethylene-toluene may be used in place of the xylene shown. In some cases the use of more than one material in a class improves the compatibility or other behavior of another material in the class; for instance, the use of rosin in a blend containing a polyamide resin often promotes better compatibility of the polyamide with the waxes used. It is not contemplated to use materials in blends that are incompatible in their fully blended state, within each class of substances.

Other examples of blends within each class include:

*Example 6*

| | Parts by weight |
|---|---|
| Polydimethylsiloxane—20 centistokes | 4.0 |
| Carnauba | 0.5 |
| Ozokerite | 2.0 |
| Beeswax | 0.5 |
| Alathon F (du Pont) | 2.0 |
| Perchloroethylene | 91.0 |
| | 100.0 |

This polish can be used for metal surfaces.

*Example 7*

| | Parts by weight |
|---|---|
| Polydimethylsiloxane—2,000,000 centistokes | 0.5 |
| Polydimethylsiloxane—100 centistokes | 3.5 |
| Microcrystalline wax | 6.0 |
| Piccopale 100 (Penn. Ind. Chem.) | 0.5 |
| Aroclor 4465 | 0.5 |
| 2-ethylhexanol | 35.0 |
| Amyl acetate | 54.0 |
| | 100.0 |

If desired, the basic classes of the present invention can be combined as specified and as described hereinbefore, and additionally treated in a manner known to those skilled in the art to form an emulsion. The conventional emulsifying agents, such as, for example, the oleates or stearates of morpholine, triethanolamine, monoethanolamine, alkyl aryl polyether alcohols, sodium salts of alkyl aryl polyether sulphates, fatty amine acetates, polyoxyethylene derivatives of fatty acids, sulphonated hydrocarbon compounds, et cetera, can be employed. Emulsified polishes have utility in applications wherein water-soluble dirt or other water-soluble extraneous matter must be removed from the surface to be polished, as their cleaning ability in such cases is generally greater than the non-aqueous polishes. Additionally, economic reasons may dictate their selection.

Typical emulsified polishes which can be prepared include the following Examples 8 and 9, however, the invention is not to be construed as being limited thereto.

*Example 8*

| | Parts by weight |
|---|---|
| Polydiethylsiloxane—5,000 centistokes | 4.0 |
| Emulsifiable microcrystalline wax (Petrolite Corp.) | 2.0 |
| Piccolyte S–115 (Penn. Ind. Chem.) | 0.2 |
| Mineral spirits | 46.0 |
| Atlas G–2133 (Polyoxyethylene lauryl ether) | 2.5 |
| Water | 45.3 |
| | 100.0 |

Heat the mixture of siloxane, wax, resin, mineral spirits and emulsifying agent to ninety degrees centigrade and hold at that temperature, using constant agitation, until the wax and resin are thoroughly dissolved and dispersed, then slowly add the water with very vigorous agitation until inversion occurs, after which the remaining water may be added rapidly and the mixture allowed to cool to room temperature under constant agitation.

*Example 9*

| | Parts by weight |
|---|---|
| Polydimethylsiloxane—200 centistokes | 3.0 |
| Carnauba wax | 2.0 |
| Beeswax | 2.0 |
| Aroclor 5460 | 0.5 |
| V. M. and P. naphtha | 25.0 |
| Stearic acid | 3.0 |
| Morpholine | 2.0 |
| Water | 62.5 |
| | 100.0 |

Heat all of the materials except the water to ninety degrees centigrade and agitate until the waxes and resin are thoroughly dissolved and dispersed. Heat the water to boiling and add it to the naphtha dispersion with vigorous agitation, slowly at first and then more rapidly as the emulsion is formed. Continue to agitate slowly while allowing to cool to room temperature.

In most cases emulsion polishes may be passed through a colloid mill or homogenizer to good advantage, as such treatment often improves the stability of the emulsion and assists in the preparation of an emulsion of fine particle size.

Application of both the solvent-type and emulsified polishes of the present invention is accomplished readily in conventional manner, as by wiping, pouring and speading, spraying, brushing, dipping, et cetera, depending on the particular article to be polished, and the convenience of the particular facilities available.

The wide variation illustrated by the examples in the specific resins, the specific siloxanes, the specific waxes and the specific solvents, exemplifies the wide variations of constituents that can be made in the composition and still retain the outstanding polish characteristics of the present invention.

Various modifications may be made in the compounds of the present invention without departing from the spirit or scope thereof and it is to be understood that we limit ourselves only as defined in the appended claims.

We claim:

1. A polishing composition adapted to be applied to a surface to give a glossy protective coating thereto, comprising: about 3–5 parts by weight of a liquid, substantially non-volatile, linear polydialkylsiloxane having a viscosity of about 50 to 100,000 centistokes at 25° C. to improve ease of spreading and polishing; a wax, the siloxane and wax being in such proportions as to avoid substantial haziness in said coating; a major proportion of a liquid, volatile organic solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax, and the resin.

2. A polishing composition adapted to be applied to a surface to give a glossy protective coating thereto, comprising: a liquid, substantially non-volatile, linear polydialkylsiloxane in sufficient quantity to improve ease of spreading and polishing; about 3–6.5 parts by weight of a wax, the siloxane and wax being in such proportions as to avoid substantial haziness in said coating; a major proportion of a liquid, volatile organic solvent; about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

3. A polishing composition adapted to be applied to a surface to give a glossy protective coating thereto, comprising: about 3–5 parts by weight of a liquid, substantially non-volatile, linear polydialkylsiloxane having a viscosity of about 50 to 100,000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

4. A polishing composition adapted to be applied to a surface to give a glossy protective coating thereto, comprising: about 3–5 parts by weight of a liquid, substantially non-volatile, linear polydialkylsiloxane having a viscosity of about 50 to 100,0000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

5. A polishing composition adapted to be applied to a surface to give a glossy protective coating thereto, comprising: about 3–5 parts by weight of a liquid, substantially non-volatile, linear polydimethylsiloxane having a viscosity of about 50 to 10,000 centistokes at 25° C. to improve ease of spreading and polishing; a wax, the siloxane and wax being in such proportions as to avoid substantial haziness in said coating; a major proportion of a liquid, volatile organic solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

6. A polishing composition adapted to be applied to a surface to give a glossy protective coating thereto, comprising: a liquid, substantially non-volatile, linear polydimethylsiloxane in sufficient quantity to improve ease of spreading and polishing; about 3–6.5 parts by weight of a wax, the siloxane and wax being in such proportions as to avoid substantial haziness in said coating; a major proportion of a liquid, volatile organic solvent; about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

7. A polishing composition adapted to be applied to a surface to give a glossy protective coating thereto, comprising: about 3–5 parts by weight of a liquid, substantially non-volatile, linear polydimethylsiloxane having a viscosity of about 50 to 10,000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

8. A polishing composition adapted to be applied to a surface to give a glossy protective coating thereto, comprising: about 3–5 parts by weight of a liquid, substantially non-volatile, linear polydimethylsiloxane having a viscosity of about 50 to 100,000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

9. A polishing composition adapted to be applied to a surface to give a glossy protective coating thereto, comprising: about 3–5 parts by weight of a liquid, substantially non-volatile, linear polydialkylsiloxane having a viscosity of about 50 to 100,000 centistokes at 25° C. to improve ease of spreading and polishing; a wax, the siloxane and wax being in such proportions as to avoid substantial haziness in said coating; a major proportion of a liquid, volatile organic solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being a member of the class consisting of terpene hydrocarbon resins, resinous chlorinated polyphenyls, and resinous polyethylene, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

10. A polishing composition adapted to be applied to a surface to give a glossy protective coating thereto, comprising: a liquid, substantially non-volatile, linear polydialkylsiloxane in sufficient quantity to improve ease of spreading and polishing; about 3–6.5 parts by weight of a wax, the siloxane and wax being in such proportions as to avoid substantial haziness in said coating; a major proportion of a liquid, volatile organic solvent; about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being a member of the class consisting of terpene-hydrocarbon resins, resinous chlorinated polyphenyls, and resinous polyethylene, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

11. A polishing composition adapted to be applied to a surface to give a glossy protective coating thereto, comprising: about 3–5 parts by weight of a liquid, substantially non-volatile, linear polydialkylsiloxane having a viscosity of about 50 to 100,000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and a thermoplastic, substantially non-cross-linked resin, substantially non-volatile at ordinary room temperatures, compatible with the wax, at least miscible with the solvent, and substantially incompatible with the siloxane, the resin being a member of the class consisting of terpene hydrocarbon resins, resinous chlorinated polyphenyls, and resinous polyethylene, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

12. A polishing composition adapted to be applied to a surface to give a glossy protective coating thereto, comprising: about 3–5 parts by weight of a liquid, substantially non-volatile, linear polydialkylsiloxane having a viscosity of about 50 to 100,000 centistokes at 25° C. to improve ease of spreading and polishing; about 3–6.5 parts by weight of a wax, the siloxane and wax being in such proportions as to avoid substantial haziness in said coating; a major proportion of a liquid, volatile organic solvent; and about 1-3 parts by weight of a thermoplastic, substantially non-crosslinked resin, substantially non-volatile at ordinary room temperatures, compatible with the wax, at least miscible with the solvent, and substantially incompatible with the siloxane, the resin being a member of the class consisting of terpene hydrocarbon resins, resinous chlorinated polyphenyls, and resinous polyethylene, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

13. A polishing composition adapted to be applied to a surface to give a glossy protective coating thereto, comprising: about 3–5 parts by weight of a liquid, substantially non-volatile, linear polydiethylsiloxane having a viscosity of about 5,000 to 100,000 centistokes at 25° C. to improve ease of spreading and polishing; about 3–6.5 parts by weight of a wax, the siloxane and wax being in such proportions as to avoid substantial haziness in said coating; a major proportion of a liquid, volatile solvent; and about 1–3 parts by weight of a thermoplastic, substantially non-crosslinked resin, substantially non-volatile at ordinary room temperatures, compatible with the wax, at least miscible with the solvent, and substantially incompatible with the siloxane, the resin being a member of the class consisting of terpene hydrocarbon resins, resinous chlorinated polyphenyls, and resinous polyethylene, the resin being present in sufficient proportions to improve the gloss but in an amount less than that imparting substantial stickiness to said coating, and the solvent being present in sufficient quantity to function as a mutual solvent-dispersant for the siloxane, the wax and the resin.

14. A surface finishing composition consisting essentially of 3.0–5.0 parts by weight of fluid polydialkylsiloxane, 3.0–6.5 parts by weight of a mixture of mineral and vegetable waxes; 60.0–120.0 parts by weight of a volatile paraffinic hydrocarbon dissolving and dispersing the waxes and entirely miscible with the siloxane, and 1.0–3.0 parts by weight of a terpene hydrocarbon resin, the whole forming a dispersion capable of re-mixture to substantial homogeneity upon separation thereof.

15. A surface finishing dispersion consisting essentially of 3.0–5.0 parts by weight of fluid polydimethylsiloxane, 2.0–4.0 parts by weight of a mixture of mineral waxes, 1.0–2.5 parts by weight of a vegetable wax, 60.0–120.0 parts by weight of a volatile paraffinic hydrocarbon solvent-dispersant for the waxes, the solvent being entirely miscible with the siloxane, and 1.0–3.0 parts by weight of a terpene hydrocarbon resin.

16. A surface finishing composition consisting of 3.0–5.0 parts by weight of fluid polydimethylsiloxane, 2.0–4.0 parts by weight of the mineral waxes ozokerite and paraffin, 1.0–2.5 parts by weight of vegetable waxes of the group consisting of esparto, sugar-cane and carnauba wax, 60.0–120.0 parts by weight of a volatile paraffinic hydrocarbon solvent-dispersant for the waxes, the solvent dispersant being entirely miscible with the siloxane, and 1.0–3.0 parts by weight of a terpene hydrocarbon resin, the whole forming a dispersion capable of re-mixutre to substantial homogeneity upon separation thereof.

17. A surface finishing composition consisting essentially of 3.0–5.0 parts by weight of fluid polydimethylsiloxane, 2.0–4.0 parts by weight of a mixture of mineral waxes, 1.0–2.5 parts by weight of a mixture of vegetable waxes, 60.0–120.0 parts by weight of naphtha, and 1.0–3.0 parts by weight of a terpene hydrocarbon resin.

18. A surface finishing composition consisting essentially of 3.0–5.0 parts by weight of fluid polydimethylsiloxane, 3.0–6.5 parts by weight of mineral and vegetable waxes, 15.0–55.0 parts by weight of mineral spirits, 10.0–45.0 parts by weight of V. M. and P. naphtha, and 1.0–3.0 parts by weight of a terpene hydrocarbon resin.

19. A surface finishing composition consisting essentially of 3.0–5.0 parts by weight of fluid polydialkylsiloxane, 2.0–4.0 parts by weight of mineral waxes, 1.0–2.5 parts by weight of vegetable waxes, 60.0–120.0 parts by weight of a volatile paraffinic hydrocarbon solvent, the solvent being miscible with the siloxane, 1.0–3.0 parts by weight of a terpene hydrocarbon resin, and 1.0–3.0 parts by weight of a metallic soap insoluble in water.

20. A surface finishing composition consisting essentially of 3.0–5.0 parts by weight of fluid polydimethylsiloxane, 2.0–4.0 parts by weight of mineral waxes, 1.0–2.5 parts by weight of vegetable waxes, 60.0–120.0 parts by weight of a volatile paraffinic hydrocarbon solvent, the solvent being miscible with the siloxane, 1.0–3.0 parts by weight of a terpene hydrocarbon resin, and 1.0–3.0 parts by weight of a soap selected from the group consisting of the aluminum stearates and aluminum palmitate.

21. A surface polish consisting essentially of 3.0–5.0 parts by weight of fluid polydialkylsiloxane, 2.0–4.0 parts by weight of mineral waxes, 1.0–2.5 parts by weight of vegetable waxes, 60.0–120.0 parts by weight of a volatile paraffinic hydrocarbon solvent, 1.0–3.0 parts by weight of a terpene hydrocarbon resin, 1.0–3.0 parts by weight of a metallic soap insoluble in water, and 10.0–30.0 parts by weight of an abrasive of a size remaining in suspension in the composition.

22. A surface polish consisting essentially of 3.0–5.0 parts by weight of fluid polydialkylsiloxane, 2.0–4.0 parts by weight of mineral waxes, 1.0–2.5 parts by weight of vegetable waxes, 60.0–120.0 parts by weight of a volatile paraffinic hydrocarbon solvent, 1.0–3.0 parts by weight of a terpene hydrocarbon resin, 1.0–3.0 parts by weight of a metallic soap insoluble in water, and 10.0–30.0 parts by weight of a diatomaceous silica for removing the surface portions of a surface coating, the mixture forming a dispersion re-mixable to its original condition after separation thereof.

23. A surface coating composition consisting essentially of 3.0–5.0 parts by weight of polydimethylsiloxane fluid, 1.0–1.5 parts by weight of ozokerite, 1.0–2.5 parts by weight of paraffin, 1.0–2.5 parts by weight of vegetable waxes, 60.0–120.0 parts by weight of a volatile paraffinic hydrocarbon solvent, 1.0–3.0 parts by weight of a terpene hydrocarbon resin, 1.0–3.0 parts by weight of aluminum palmitate and 10.0–30.0 parts by weight of an abrasive.

24. A surface coating composition consisting essentially of 3.0–5.0 parts by weight of polydimethylsiloxane having a viscosity of 200–500 centistokes at 25 degrees centigrade, 1.0–1.5 parts by weight of ozokerite, 1.0–2.5 parts by weight of paraffin, 1.0–2.5 parts by weight of esparto wax, 15.0–55.0 parts by weight of mineral spirits, 10.0–45.0 parts by weight of V. M. and P. naphtha, 1.0–3.0 parts by weight of a terpene hydrocarbon resin, 1.0–3.0 parts by weight of aluminum mono-stearate, and 12.0–26.0 parts by weight of a diatomaceous silica.

25. A surface finishing composition consisting of 3.0–5.0 parts by weight of fluid polydimethylsiloxane, 2.0–4.0 parts by weight of mineral waxes having a melting range of 125–195 degrees Fahrenheit, 1.0–2.5 parts by weight of vegetable waxes having a melting range of 162–187 degrees Fahrenheit, 60.0–120.0 parts by weight of a volatile paraffinic hydrocarbon solvent-dispersant, the solvent-dispersant having a boiling range of 218–390 degrees Fahrenheit, 1.0–3.0 parts by weight of a terpene hydrocarbon resin melting at 115–125 degrees centigrade, 1.0–3.0 parts by weight of aluminum mono-stearate, 12.0–26.0 parts by weight of a diatomaceous silica, and 1.0–5.0 parts by weight of water.

26. A surface finishing composition consisting essentially of 3.0–5.0 parts by weight of a polydialkylsiloxane having a viscosity ranging from 200–500 centistokes at 20 degrees centigrade, 3.0–6.5 parts by weight of a mixture of mineral and vegetable waxes, the mineral waxes having a melting point ranging from 125–195 degrees Fahrenheit, and the vegetable waxes having a melting point range from 162–187 degrees Fahrenheit, 60.0–120.0 parts by weight of a volatile paraffinic hydrocarbon solvent dissolving and dispersing the waxes and entirely miscible with the siloxane and having a boiling range of 218–391 degrees Fahrenheit, and 1.0–3.0 parts by weight of a terpene hydrocarbon resin having a melting point of 115–125 degrees centrigrade, the whole forming a dispersion capable of re-mixture to substantial homogeneity upon separation thereof.

27. A surface finishing dispersion consisting essentially of 3.0–5.0 parts by weight of a polydialkylsiloxane having a viscosity of 200–500 centistokes at 20 degrees centigrade, 2.0–4.0 parts by weight of a mixture of vegetable waxes having a melting point range of 125–195 degrees Fahrenheit, 1.0–2.5 parts by weight of a vegetable wax having a melting point of 162–187 degrees Fahrenheit, 60.0–120.0 parts by weight of a volatile paraffinic hydrocarbon solvent dispersant for the waxes, the solvent being entirely miscible with the siloxane and having a boiling range of 218–391 degrees Fahrenheit, and 1.0–3.0 parts by weight of a terpene hydrocarbon resin having a melting point of 115–125 degrees centigrade.

28. A surface finishing composition consisting essentially of 3.0–5.0 parts by weight of polydimethylsiloxane having a viscosity of 200–500 centistokes at 20 degrees centigrade, 2.0–4.0 parts by weights of a mixture of the mineral waxes ozokerite and paraffin, 1.0–2.5 parts by weight of a vegetable wax of the group consisting of esparto, sugar-cane and carnauba wax, 60.5–120.0 parts by weight of a volatile paraffinic hydrocarbon having a boiling range of 218–391 degrees Fahrenheit as a solvent-dispersant for the waxes, the solvent-dispersant being entirely miscible with the siloxane, and 1.0–3.0 parts by weight of a terpene hydrocarbon resin having a melting point of 115–125 degrees centigrade.

29. A surface finishing composition consisting essentially of 3.0–5.0 parts by weight of polydimethylsiloxane having a viscosity of 200–500 centistokes at 20 degrees centigrade, 2.0–4.0 parts by weight of a mineral wax of the group consisting of ozokerite having a melting point of 190–195 degrees Fahrenheit and paraffin having a melting point of 125–195 degrees Fahrenheit, 1.0–2.5 parts by weight of a vegetable wax of the group consisting of esparto, sugar-cane and carnauba wax, the vegetable waxes respectively having a melting point range of 162–164 degrees Fahrenheit, 174.2–177.8 degrees Fahrenheit and 182–187 degrees Fahrenheit, 60.0–120.0 parts by weight of a petroleum naphtha having a boiling range of 300–325 degrees Fahrenheit for dissolving-dispersing the waxes for miscibility with the siloxane, and 1.0–3.0 parts by weight of a terpene hydrocarbon resin having a melting point of 115–125 degrees centigrade, the composition being capable of re-mixture to substantially homogeneity upon separation thereof.

References Cited in the file of this patent

UNITED STATES PATENTS

| | | |
|---|---|---|
| 2,392,805 | Biefeld | Jan. 15, 1946 |
| 2,409,683 | Howk et al. | Oct. 22, 1946 |
| 2,527,793 | Bump et al. | Oct. 31, 1950 |
| 2,614,049 | Swanson | Oct. 14, 1952 |
| 2,733,224 | Smith et al. | Jan. 31, 1956 |

OTHER REFERENCES

Chemical and Engineering News, Dec. 13, 1948, page 3734.

Chatfield, Varnish Constituents, Leonard Hall, Ltd. (1953), page 791.